US012177032B2

United States Patent
Panchanathan et al.

(10) Patent No.: US 12,177,032 B2
(45) Date of Patent: Dec. 24, 2024

(54) SYSTEMS AND METHODS FOR PROVIDING SDWAN IP MULTICAST WITHOUT A RENDEZVOUS POINT

(71) Applicant: Cisco Technology, Inc., San Jose, CA (US)

(72) Inventors: Manikandan Panchanathan, Chennai (IN); Vengada Prasad Govindan, Chennai (IN); Alfred C. Lindem, III, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 248 days.

(21) Appl. No.: 17/710,071

(22) Filed: Mar. 31, 2022

(65) Prior Publication Data

US 2023/0318866 A1    Oct. 5, 2023

(51) Int. Cl.
*H04L 12/18*    (2006.01)
*H04L 12/44*    (2006.01)
*H04L 45/122*   (2022.01)

(52) U.S. Cl.
CPC .......... *H04L 12/1886* (2013.01); *H04L 12/44* (2013.01); *H04L 45/122* (2013.01)

(58) Field of Classification Search
CPC .... H04L 12/1886; H04L 12/44; H04L 45/122
See application file for complete search history.

(56) References Cited

U.S. PATENT DOCUMENTS

| | | | |
|---|---|---|---|
| 10,958,564 B1 | 3/2021 | Asthana et al. | |
| 2008/0101361 A1 | 5/2008 | Brown | |
| 2019/0114080 A1* | 4/2019 | Pydipaty | G06F 16/275 |
| 2020/0177503 A1* | 6/2020 | Hooda | H04L 12/66 |
| 2021/0160169 A1 | 5/2021 | Shen et al. | |
| 2021/0314160 A1 | 10/2021 | Suresh et al. | |

* cited by examiner

*Primary Examiner* — Khoa Huynh
(74) *Attorney, Agent, or Firm* — Baker Botts L.L.P.

(57) ABSTRACT

According to certain embodiments, a method by a router in a software-defined wide-area network (SDWAN) includes determining one or more replicators in the SDWAN and generating a multicast distribution tree that includes the determined one or more replicators. The method further includes receiving multicast traffic from a source and creating a (S,G) route for the received multicast traffic. The method further includes replicating the multicast traffic using the multicast distribution tree.

20 Claims, 3 Drawing Sheets

SYSTEMS AND METHODS FOR PROVIDING SDWAN IP MULTICAST WITHOUT A RENDEZVOUS POINT

TECHNICAL FIELD

The present disclosure generally relates to a software-defined wide-area network (SDWAN), and more specifically to SDWAN IP multicast techniques without a rendezvous point.

BACKGROUND

Multicast techniques allow for sending data to a group of interested receivers. Multicast techniques may make efficient use of network infrastructure, for example, by requiring the source to send a packet only once, even if the packet needs to be delivered to a large number of receivers. Nodes in the network, such as switches and routers, may replicate the packet so that the packet reaches each interested receiver.

DESCRIPTION OF EXAMPLE EMBODIMENTS

Overview

Figure 1:
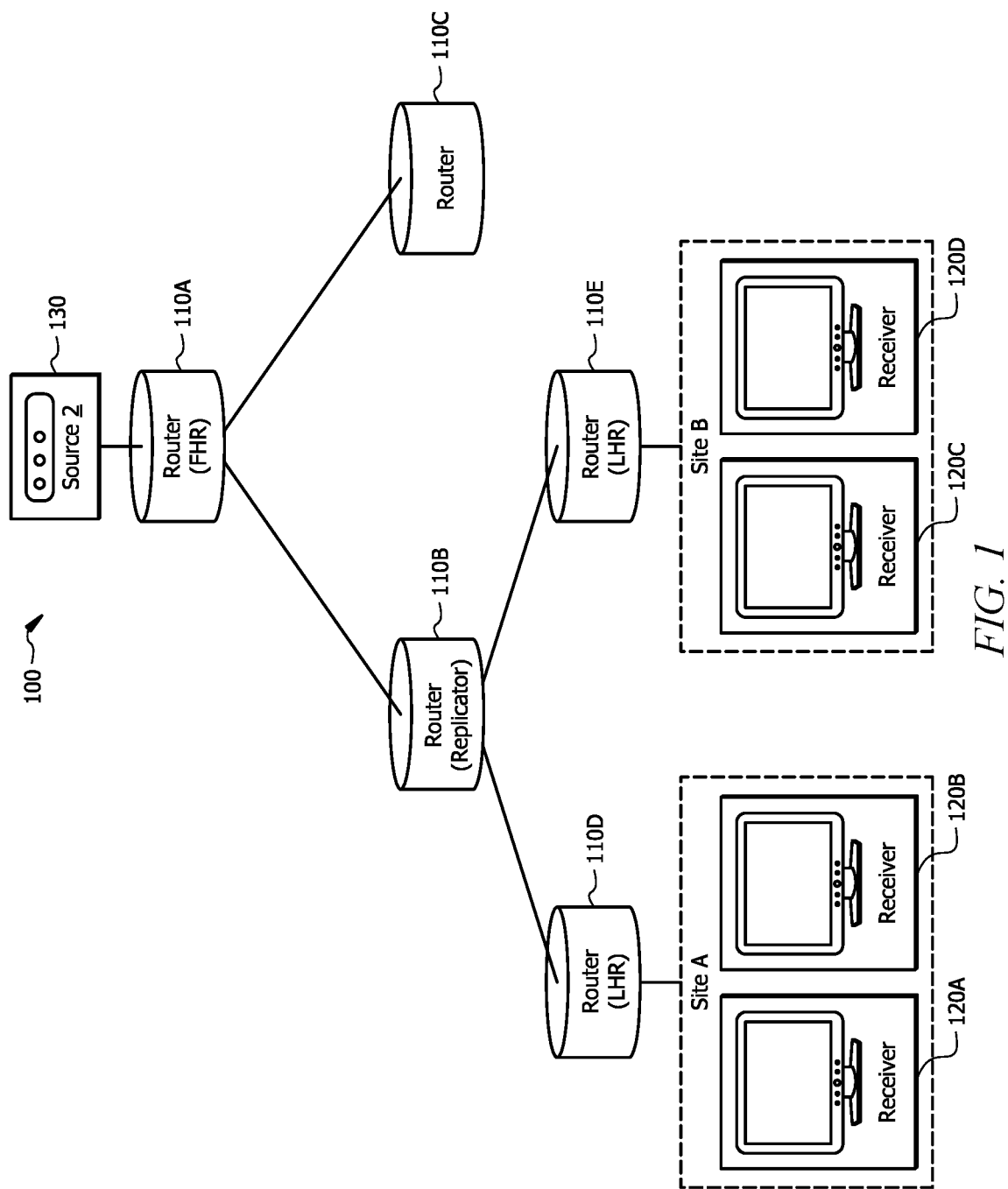
FIG. 1 illustrates an example of a software-defined wide-area network (SDWAN) that provides IP multicast without utilizing a rendezvous point, in accordance with certain embodiments.

According to certain embodiments, a router in a Software-Defined Wide-Area Network (SDWAN) includes one or more processors and one or more computer-readable non-transitory storage media. The one or more computer-readable non-transitory storage media includes instructions that, when executed by the one or more processors, cause one or more components of the router to perform operations including determining one or more replicators in the SDWAN and generating a multicast distribution tree comprising the determined one or more replicators. The operations further include receiving multicast traffic from a source and creating a (S,G) route for the received multicast traffic. The operations further include replicating the multicast traffic using the multicast distribution tree.

According to certain embodiments, a method by a router in a software-defined wide-area network (SDWAN) includes determining one or more replicators in the SDWAN and generating a multicast distribution tree that includes the determined one or more replicators. The method further includes receiving multicast traffic from a source and creating a (S,G) route using the multicast distribution tree. The method further includes replicating the multicast traffic using the multicast distribution tree.

Technical advantages of certain embodiments of this disclosure may include one or more of the following. Certain systems and methods described herein provide SDWAN IP multicasting without utilizing a Rendezvous Point (RP). Unlike existing SDWANs that require an RP, the disclosed embodiments eliminate entirely the role of the RP. As a result, RP related state transitions (e.g., PIM registration) are bypassed, one hop of forwarding from RP to a replicator is eliminated, less route exchanges and Overlay Management Protocol (OMP) states are required, and replication using Shortest-Path Tree (SPT) is performed instantly. These and other features of the disclosed embodiments thereby reduce network bandwidth and computer resource requirements (e.g., computer memory and processing power) that would otherwise be required by the use of an RP in SDWAN IP multicasting. Other technical advantages will be readily apparent to one skilled in the art from the following figures, descriptions, and claims. Moreover, while specific advantages have been enumerated above, various embodiments may include all, some, or none of the enumerated advantages.

Example Embodiments

Embodiments of this disclosure describe systems and methods for providing IP multicasting in SDWAN environments without utilizing a rendezvous point (RP). The RP has typically been utilized in IP multicast/MVPN implementations. However, the placement of the RP in a network often causes issues with multicast traffic. For example, the RP placement may cause multicast trees not to converge due to issues in (*, G) forwarding, especially when the first hop router (FHR) and the RP are placed in the same service side network of the same site. Embodiments of the disclosure remove the RP from the SDWAN network entirely, greatly simplifying the configuration and providing operational simplicity for deploying an SDWAN multicast solution.

FIG. 1 illustrates an example of software-defined wide-area network (SDWAN) 100 that provides IP multicast without utilizing an RP. SDWAN 100 may include multiple routers 110 (e.g., 110A-110E), one or more receivers 120 (e.g., 1120A-120D) and one or more sources 130. The physical topology for SDWAN 100 is simply a cloud (representing the WAN) with all routers connecting to the cloud. For purposes of example and explanation, FIG. 1 shows certain connections between certain components (such as connections between certain routers 110). However, FIG. 1 does not imply a particular physical topology as the connections may be made via the cloud.

In general, SDWAN 100 may be an underlay network that supports a virtual overlay network. An underlay network may include, for example, all or a portion of: the Internet, one or more Internet Protocol (IP) networks (such as one or more IP Security, IPsec, networks), one or more Multiprotocol Label Switching (MPLS) networks, one or more cellular network(s), and/or other suitable networks. In certain embodiments, the virtual overlay network may include data plane connections/tunnels that carry traffic between components of the SDWAN. As an example, the virtual overlay network may include Internet Protocol Security (IPsec) tunnels that carry traffic between components of the SDWAN. In certain embodiments, the virtual overlay network may carry traffic between a plurality of sites (including, for example, a first site A and a second site B) over the underlay network. Each site may connect to the network via one or more WAN-edge routers. As illustrated, the first site A connects to the network via edge router 110D, and the second site B connects to the network via edge router 110E. In certain embodiments, first site A and second site B may be associated with an organization. As an example, first site A may be a central office of the organization, and site B may be a branch or regional office of the organization. SDWAN 100 facilitates communication among receivers 120 in the various offices.

In certain embodiments, a source 130 may originate a multicast stream. As one example, source 130 could be a video camera that provides video data to be multicast to receivers 120A-120D via routers 110. A first router 110A may be configured as an FHR that receives the multicast stream from source 130 and communicates the multicast stream into SDWAN 100. Typically, router 110A of SDWAN 100 would communicate the multicast stream from source 130 to an RP. The RP of typical SDWANs acts as a meeting place for sources and receivers of the multicast stream. For example, router 110A may register source 130 with the RP such that source 130 sends its multicast stream to the RP to be forwarded to receivers 120. However, as described in more detail herein, SDWAN 100 provides IP multicasting without requiring an RP. To do so, router 110A sends the multicast stream from source 130 directly to router 110B, which is configured as a replicator. Router 110B replicates the multicast stream and sends a copy to router 110D and another copy to router 110E. Optionally, router 110C may also be configured as a replicator (as an example, router 110C could be configured as a replicator that sends multicast traffic to another LHR, not shown). Router 110D is configured as an LHR that serves receivers 120A and 120B associated with site A, and router 110E is configured as an LHR that serves receivers 120C and 120D associated with site B. Examples of receivers 120 may include user devices, such as a desktop computer system, a laptop or notebook computer system, an interactive kiosk, a mobile telephone, a personal digital assistant (PDA), a tablet computer system, an augmented/virtual reality device, etc. Additional examples of receivers 120 may include servers, mainframes, data centers, cloud platforms, or any other computer system capable of receiving a multicast stream.

As described above, a replicator receives multicast data and makes a copy of the multicast data for a receiver 120. The replicator can replicate multicast traffic that is rooted anywhere, such as either * root, for example, in the case of a (*, G) stream, or S root, for example, in the case of an (S, G) stream. In both cases, the G represents multiple receivers that want to receive the multicast stream. The S indicates that the multicast stream is to be received from a particular source, such as an IP address of a particular video camera. The * is a wildcard indicating that the multicast stream can be received from any source.

Although this disclosure describes an SDWAN in a particular manner, this disclosure contemplates any SDWAN in any suitable manner. For example, for simplicity, FIG. 1 shows certain communication paths between routers 120. However, additional communication paths may exist between various routers 120. Furthermore, in certain embodiments, the network may include other routers 120 (which may be configured as FHRs, replicators, or LHRs, for example), and one or more of routers 120 may communicate with one or more of the other routers. Moreover, SDWAN 100 may include any other suitable components, such as a controller in a control plane that may provision, maintain, and/or secure the overlay network and/or a manager in a management/orchestration plane.

Figure 2:
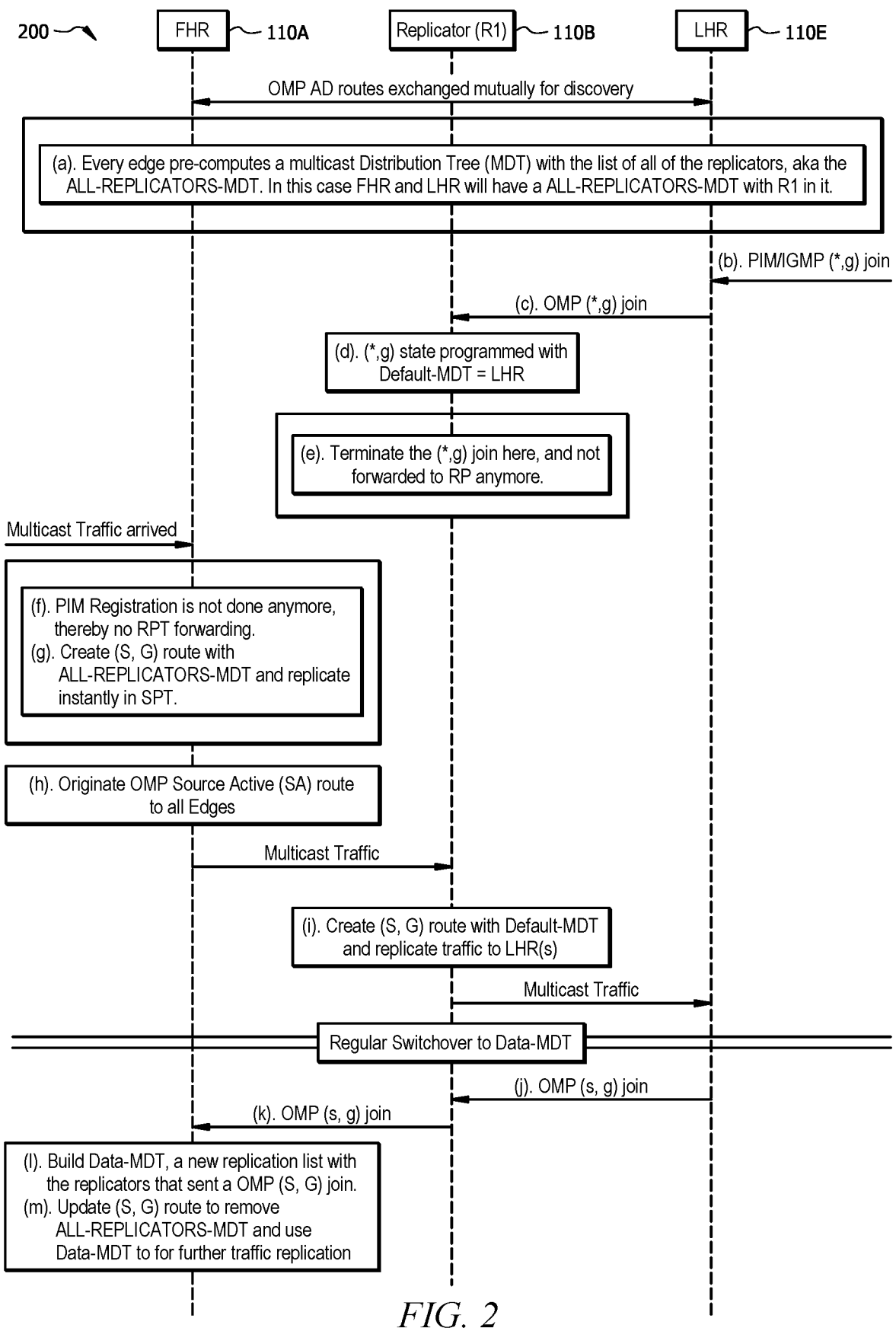
FIG. 2 illustrates an example of a message flow for SDWAN IP multicast without utilizing a rendezvous point, in accordance with certain embodiments.

FIG. 2 illustrates a message flow 200 that demonstrates the operation of SDWAN 100 for providing IP multicasting without utilizing an RP that is typically used for multicasting. At step (a), each router 110 of SDWAN 100 pre-computes and locally stores a Multicast Distribution Tree (MDT) that includes a list of the replicators in SDWAN 100. This MDT may be referred to as the ALL-REPLICATORS-MDT. In the example of FIG. 2, FHR 110A and LHR 110E each generate and store an ALL-REPLICATORS-MDT that lists replicator "R1" 110B.

At step (b), a receiver 120 behind LHR 110E sends a PIM/IGMP (*, G) join message to LHR 110E in order to begin receiving a multicast traffic stream. At step (c), LHR 110E sends an OMP (*, G) join message to replicator 110B. At step (d), replicator 110B programs a (*, G) state with Default-MDT=LHR 110E. Typically, replicator 110B would then forward the (*, G) join to an RP within SDWAN 100. However, embodiments of the disclosure provide RP-less multicasting, so replicator 110B at step (e) terminates the (*, G) join and does not forward the (*, G) join to an RP.

After step (e), FHR 110A receives multicast traffic from source 130. At step (f), FHR 110A avoids performing PIM Registration that is typically performed in order to provide IP multicasting. Because PIM Registration is not performed, FHR 110A also avoids performing RP=Tree (RPT) forwarding. Instead of performing PIM Registration and RPT forwarding, FHR 110A instead in step (g) creates an (S,G) route with output interfaces for the ALL-REPLICATORS-MDT and instantly replicates the (S,G) multicast traffic on the ALL-REPLICATORS-MDT. At step (h), FHR 110A originates Overlay Management Protocol (OMP) Source Active (SA) route to all edge routers 110 and provides multicast traffic from source 130 to replicator 110B.

At step (i) replicator 110B create the (S,G) route with Default-MDT and replicates the multicast traffic from FHR 110A to LHR 110E. LHR 110E would then send the multicast traffic to the receiver 120 that sent the PIM/IGMP (*, G) join message in step (a).

At step (j) LHR 110E sends an OMP (S,G) join to replicator 110B. At step (k), replicator 110B forwards the OMP (S,G) join to FHR 110A. At step (l), FHR 110A builds the DATA-MDT—a new replication list with the replicators that sent an OMP (S,G) join (e.g., replicator 110B in this example). At step (m), FHR 110A updates the (S,G) route to remove ALL-REPLICATORS-MDT and use DATA-MDT for further traffic replication. In general, the RPT (which includes a replicator hop) would be replaced prior to the Data Tree being replaced. Furthermore, the entire RPT phase (analogous to phase 2) in PIM is avoided.

In summary, message flow 200 provides changes to the typical control-plane sequence in order to remove the need for an RP. The data-plane is unchanged from the standpoint of the replicator, but the SDWAN edge router at the multicast source (e.g., FHR 110A) is configured to bypass the RP. First, when SDWAN edges such as FHR 110A and LHR 110 discover the SDWAN multicast topology using OMP AD routes, they will pre-build a list of replicators in the network (i.e., the ALL-REPLICATORS-MDT). Second, when a receiver 120 joins an ASM multicast group, the (*,G) join will be terminated in the replicator 110B, as opposed to being sent to a PIM RP (if one is available). Third, when a multicast source 130 starts sending multicast traffic at an SDWAN site, the local SDWAN edge router (e.g., FHR 110A) replicates the packets immediately on the ALL-REPLICATORS-MDT. PIM registration to the RP is not required and thereby RPT forwarding is avoided by FHR 110A.

By providing SDWAN IP multicasting without requiring an RP, embodiments of the disclosure provide numerous advantages over typical SDWAN IP multicasting solutions that utilize RPs. First, the disclosed embodiments provide a simplified deployment that is easier to debug since RP designs and configurations are not needed. Second, the disclosed embodiments provide optimized forwarding and faster convergence. By eliminating the role of RP: (a) RP related state transitions (e.g., PIM registration) are bypassed, (b) one hop of forwarding from RP-to-Replicator is not needed, (c) less route exchanges and OMP states required, and (d) instant replication using SPT. Additional advantages include: 1) the new replicator-centric design of the disclosed embodiments is more flexible for software-defined load-balancing and policies; 2) the simplified ASM design of the disclosed embodiments avoids the overhead involved in RP design (static/dynamic), configuration, and placement; 3) convergence is faster since one hop of traffic forwarding from RP to the replicator is avoided and replication instantly starts in the pre-built SPT from the very first packet; and 4) the disclosed embodiments mitigate the most common "single point of failure" issues seen with RPs in the network and need to have protocols like Multicast Source Discovery Protocol (MSDP) running over WAN.

Furthermore, the disclosed embodiments greatly simplify multicast at SDWAN sites that do not have a PIM network but have sources/receivers directly connected to the SDWAN edges. The simplified model of the disclosed embodiments also improves convergence by bypassing the RP control plane. In addition, the disclosed embodiments offer an improved model over current solutions for larger sites that have a PIM network underneath. In this case, each SDWAN edge can advertise itself as the RP to the PIM network. This RP advertisement can be done without any user intervention or added configuration, and preferably through BSR. This advertisement is needed to interop with the PIM routers in SDWAN site attaching subnets that are not directly attached.

Figure 3:
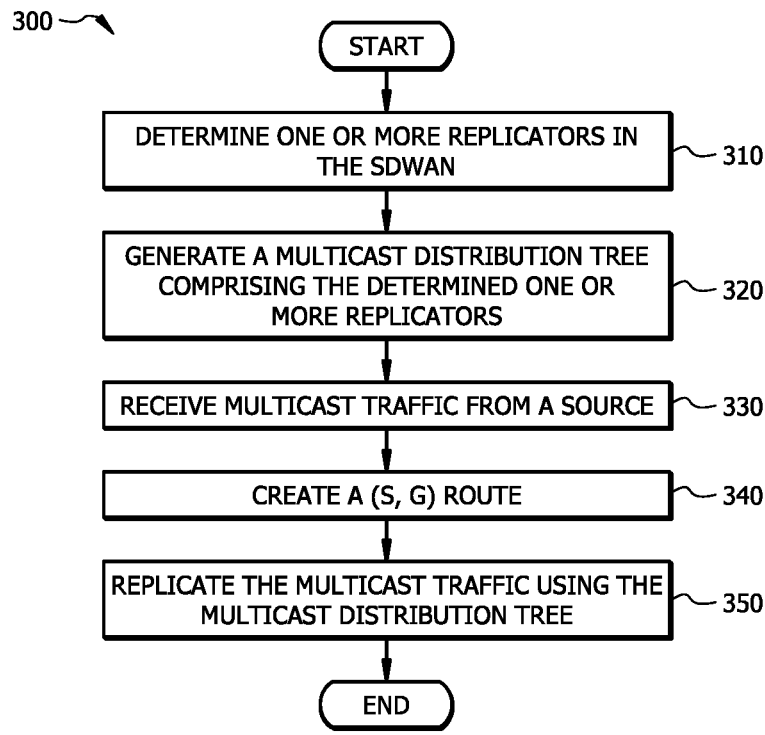
FIG. 3 illustrates an example of a method for providing SDWAN IP multicast without a rendezvous point, in accordance with certain embodiments.

FIG. 3 is a flow diagram illustrating an example method 300 by a router in an SDWAN. For example, method 300 may be performed by FHR 110A in SDWAN 100.

Method 200 may begin in step 310 where method 300 determine one or more replicators in the SDWAN. In some embodiments, the one or more replicators are determined by discovering the SDWAN multicast topology using Overlay Management Protocol (OMP) AD routes. After step 310, method 300 proceeds to step 320.

In step 320, method 300 generates a multicast distribution tree comprising the determined one or more replicators of step 310. In some embodiments, the multicast distribution tree is an ALL-REPLICATORS-MDT. In some embodiments, the multicast distribution tree is stored in local memory. After step 320, method 300 proceeds to step 330.

In step 330, method 300 receives multicast traffic from a source. In some embodiments, the source is source 130. After step 330, method 300 proceeds to step 340.

In step 340, method 300 creates an (S,G) route for the received multicast traffic of step 230. In some embodiments, step 340 includes creating an (S,G) route with output interfaces for the ALL-REPLICATORS-MDT. After step 340, method 300 proceeds to step 350.

In step 350, method 300 replicates the multicast traffic of step 330 using the multicast distribution tree of step 320. In some embodiments, step 350 includes instantly replicating the (S,G) multicast traffic on the ALL-REPLICATORS-MDT. In some embodiments, the multicast traffic is replicated in step 350 without the use of an RP and without using RP tree (RPT) forwarding. In some embodiments, the multicast traffic is replicated in step 350 without performing PIM registration. After step 350, method 300 may end.

Figure 4:
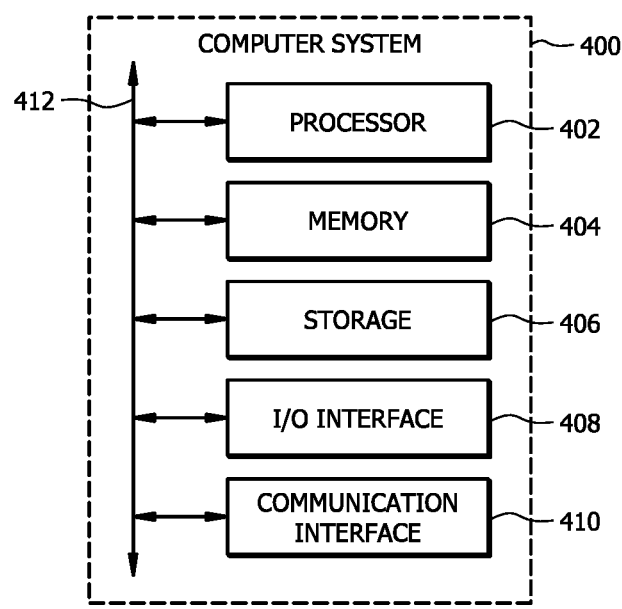
FIG. 4 illustrates an example of a computer system, in accordance with certain embodiments.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The invention claimed is:

1. A router in a software-defined wide-area network (SDWAN), the router comprising:
   one or more processors; and
   one or more computer-readable non-transitory storage media, the one or more computer-readable non-transitory storage media comprising instructions that, when executed by the one or more processors, cause one or more components of the router to perform operations comprising:
   discovering one or more replicators in the SDWAN using Overlay Management Protocol (OMP) routes;
   generating a multicast distribution tree comprising the discovered one or more-replicators;
   receiving multicast traffic from a source;
   creating a route for the received multicast traffic; and
   replicating the multicast traffic using the multicast distribution tree.

2. The router of claim 1, wherein replicating the multicast traffic using the multicast distribution tree comprises replicating the multicast traffic to one of the one or more replicators in the multicast distribution tree using a shortest-path tree (SPT).

3. The router of claim 1, wherein the router is a first hop router.

4. The router of claim 1, wherein the multicast traffic is replicated without the use of a rendezvous point (RP) and without using RP tree (RPT) forwarding.

5. The router of claim 1, wherein the multicast traffic is replicated without performing Protocol Independent Multicast (PIM) registration.

6. The router of claim 1, wherein creating the route for the received multicast traffic comprises creating the route with output interfaces for the multicast distribution tree.

7. The router of claim 1, the operations further comprising originating an Overlay Management Protocol (OMP) Source Active (SA) route to one or more edge nodes.

8. A method by a router in a software-defined wide-area network (SDWAN), the method comprising:

discovering one or more replicators in the SDWAN using Overlay Management Protocol (OMP) routes;

generating a multicast distribution tree comprising the discovered one or more-replicators;

receiving multicast traffic from a source;

creating a route for the received multicast traffic; and replicating the multicast traffic using the multicast distribution tree.

9. The method of claim 8, wherein replicating the multicast traffic using the multicast distribution tree comprises replicating the multicast traffic to one of the one or more replicators in the multicast distribution tree using a shortest-path tree (SPT).

10. The method of claim 8, wherein the router is a first hop router.

11. The method of claim 8, wherein the multicast traffic is replicated without the use of a rendezvous point (RP) and without using RP tree (RPT) forwarding.

12. The method of claim 8, wherein the multicast traffic is replicated without performing Protocol Independent Multicast (PIM) registration.

13. The method of claim 8, wherein creating the route for the received multicast traffic comprises creating the route with output interfaces for the multicast distribution tree.

14. The method of claim 8, further comprising originating an Overlay Management Protocol (OMP) Source Active (SA) route to one or more edge nodes.

15. One or more computer-readable non-transitory storage media embodying instructions that, when executed by a processor of a router, cause performance of operations comprising:

discovering one or more replicators in a software-defined wide-area network (SDWAN) using Overlay Management Protocol (OMP) routes;

generating a multicast distribution tree comprising the discovered one or more-replicators;

receiving multicast traffic from a source;

creating a route for the received multicast traffic; and replicating the multicast traffic using the multicast distribution tree.

16. The one or more computer-readable non-transitory storage media of claim 15, wherein replicating the multicast traffic using the multicast distribution tree comprises replicating the multicast traffic to one of the one or more replicators in the multicast distribution tree using a shortest-path tree (SPT).

17. The one or more computer-readable non-transitory storage media of claim 15, wherein the router is a first hop router.

18. The one or more computer-readable non-transitory storage media of claim 15, wherein the multicast traffic is replicated without the use of a rendezvous point (RP) and without using RP tree (RPT) forwarding.

19. The one or more computer-readable non-transitory storage media of claim 15, wherein the multicast traffic is replicated without performing Protocol Independent Multicast (PIM) registration.

20. The one or more computer-readable non-transitory storage media of claim 15, the operations further comprising originating an Overlay Management Protocol (OMP) Source Active (SA) route to one or more edge nodes.

* * * * *